United States Patent [19]

Chang

[11] Patent Number: 4,827,957

[45] Date of Patent: May 9, 1989

[54] SHELTER USED TO PROTECT PLANTS OR CROPS FROM ADVERSE ENVIRONMENTAL CONDITIONS

[76] Inventor: Te-Cheng Chang, No. 117, Ta-T'ung Rd., Hsi-Lo Chen, Yun-Lin Hsien, Taiwan

[21] Appl. No.: 145,848

[22] Filed: Dec. 28, 1987

[51] Int. Cl.⁴ ............................................. A01G 09/14
[52] U.S. Cl. .................................... 135/101; 135/903; 47/29; 47/31
[58] Field of Search .................... 135/101, 903; 47/20, 47/26, 28 R, 29, 31

[56] References Cited

U.S. PATENT DOCUMENTS

| | | | |
|---|---|---|---|
| 188,275 | 3/1877 | Baker | 135/101 |
| 711,225 | 10/1902 | Putnam et al. | 47/28 |
| 721,993 | 3/1903 | Amett | 135/101 |
| 789,982 | 5/1905 | Lockett | 135/903 |
| 1,009,783 | 11/1911 | Padley | 135/903 |
| 1,106,624 | 8/1914 | Cadwallader et al. | 135/903 |
| 2,029,886 | 2/1936 | Marshall | 135/903 |
| 2,094,801 | 10/1937 | Mass | 47/20 |
| 2,140,220 | 12/1938 | Colvin, Jr. | 135/903 |
| 2,886,047 | 5/1959 | Healy | 135/903 |
| 3,009,166 | 11/1961 | Sears | 135/903 |
| 3,140,563 | 7/1964 | Allen | 47/20 |
| 3,812,616 | 5/1974 | Koziol | 47/29 |
| 4,099,344 | 7/1978 | Ruemeli | 47/26 |

FOREIGN PATENT DOCUMENTS

| | | | |
|---|---|---|---|
| 167494 | 1/1986 | European Pat. Off. | 47/31 |
| 3106918 | 9/1982 | Fed. Rep. of Germany | 47/26 |
| 1464097 | 12/1966 | France | 47/28 |
| 455246 | 6/1968 | Switzerland | 135/903 |
| 1279562 | 12/1986 | U.S.S.R. | 47/29 |
| 580691 | 9/1946 | United Kingdom | 135/903 |
| 618173 | 2/1949 | United Kingdom | 47/29 |

Primary Examiner—John E. Murtagh
Assistant Examiner—Caroline D. Dennison
Attorney, Agent, or Firm—Cushman, Darby & Cushman

[57] ABSTRACT

This invention discloses a shelter used to protect plants or crops from damage by animals and adverse environmental conditions, which comprises a framework; at least one ridge pole supported by the framework; at least one pulley block supported in the ridge pole; at least one network frame, one side of which is hinged in the framework, the opposite side of which is hoisted by the pulley block; and a water-proof sheet which is supported by and covers the network frame; whereby the water-proof sheet can be hoisted up to the elevated position for cultivating plants and lowered to cover the crops for preventing them from being blown away by wind.

2 Claims, 4 Drawing Sheets

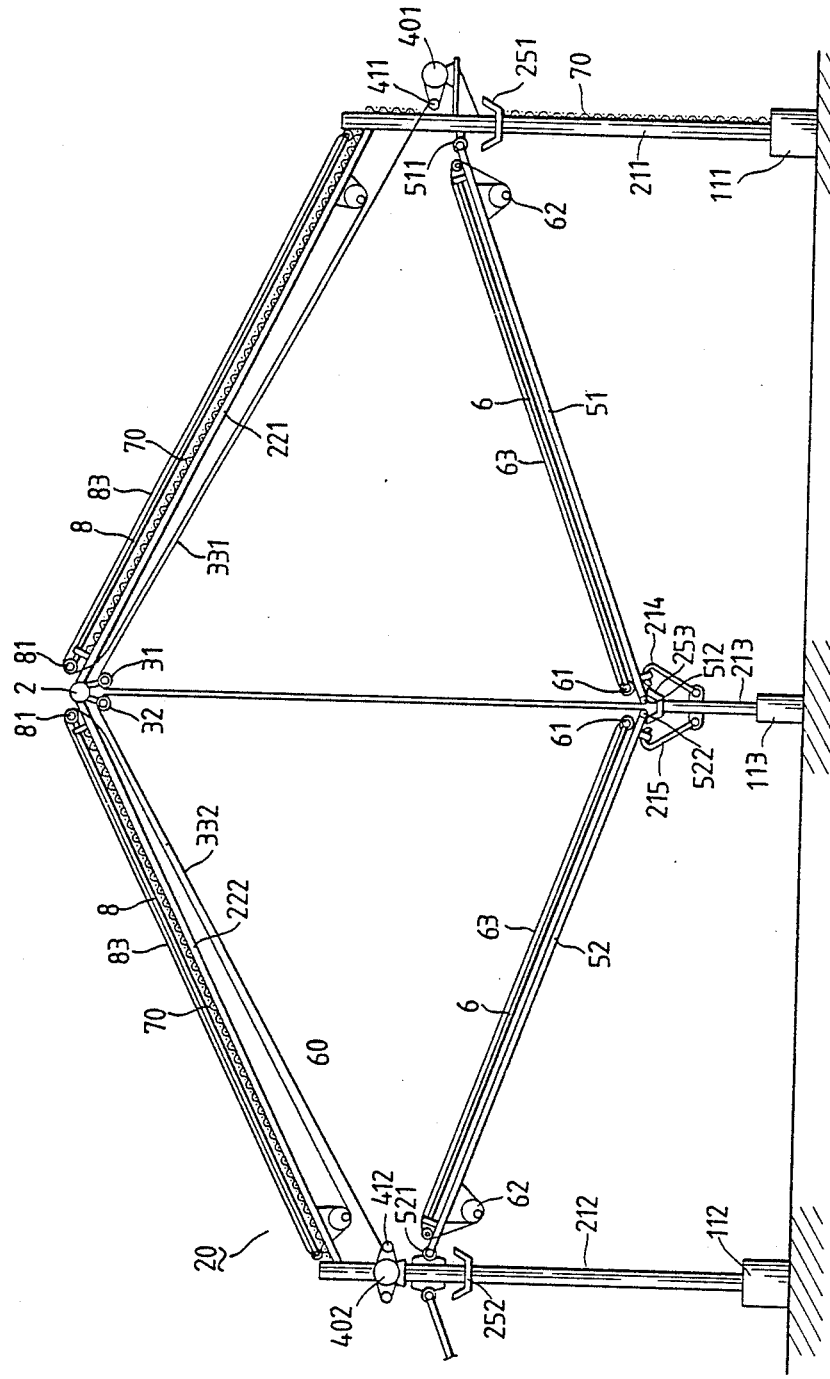

SHELTER USED TO PROTECT PLANTS OR CROPS FROM ADVERSE ENVIRONMENTAL CONDITIONS

BACKGROUND OF THE INVENTION

The present invention relates to an agricultural shelter, and more particularly to a shelter used to protect plants or crops from damage by animals and adverse environmental conditions.

As is well known, a shelter covered with netting or plastic cloth is widely used in farm steads for protecting plants from damage by animals and adverse environmental conditions. However, as the different plants have their different cultural conditions, the shelter for a certain plant, such as an orchid or a mushroom which has to be exposed to sunshine and atmosphere to a certain extent, must be changed to accommodate these conditions. The conventional shelter is inconvenient for a large-scale farm, especially to one which cultivates a great variety of farm products or to one which cultivates rotating crops, because the netting or covering has to be changed frequently to correspond with the variety of weather or the plant being cultivated. In addition, a shelter which can be used for storing harvested crops temporarily instead of using a vinyl covering sheet to protect against rain or wind during harvest season is also desired.

SUMMARY OF THE INVENTION

Therefore, the object of the present invention is to provide a shelter, the exposure degree of which can be changed easily to correspond with the weather or the plant being cultivated.

Another object of the present invention is to provide a shelter which can be used to cover the crops to prevent them from getting wet by rain or being blown away by wind.

Accordingly, the present invention provides a shelter comprising: a framework; at least one ridge pole horizontally supported by the framework; at least one pulley block supported in the ridge pole; at least one network frame with a substantial plane surface, one side of which is hinged and supported in the framework, the opposite side is hoisted by the pulley block; and a waterproof sheet which is supported by and covers the plane surface of the network frame. Therefore, the waterproof sheet can be hoisted up to the elevated position for cultivating plants and lowered to cover the crops to prevent them from being blown away.

Preferably, the framework further comprises a network roof disposed above the network frame and connected with the ridge pole, and a black net supported by and covering the network roof, which is adaptable to filter the sunlight for cultivating orchids.

Preferably, both the above-mentioned water-proof sheet and the black net are adapted to be wound up for appropriately regulating the degree of exposure to sunshine.

Preferably, the above-mentioned water-proof sheet is translucent and adaptable to filter the sunlight.

Preferably, the shelter is isolated from the surrounding by netting to protect plants or crops from damage by animals. More preferably, the netting for covering the network roof is disposed under the above-mentioned black net which covers the same.

If necessary, the periphery of the framework, except the roof portion, can be surrounded by vinyl sheet to shut out wind or/and light.

Further, if necessary, winders driven by motors can be used to wind or unwind the black net covering on the network roof and the water-proof sheet covering on the network frame, and to drive the pulley block for hoisting the network frame up or down.

BRIEF DESCRIPTION OF THE DRAWINGS

The present invention is illustrated by way of example in the accompanying drawings, in which:

FIG. 2 is a side elevational view of a sub-shelter of the embodiment illustrated in FIG. 1;

DETAILED DESCRIPTION OF THE INVENTION

Figure 1:
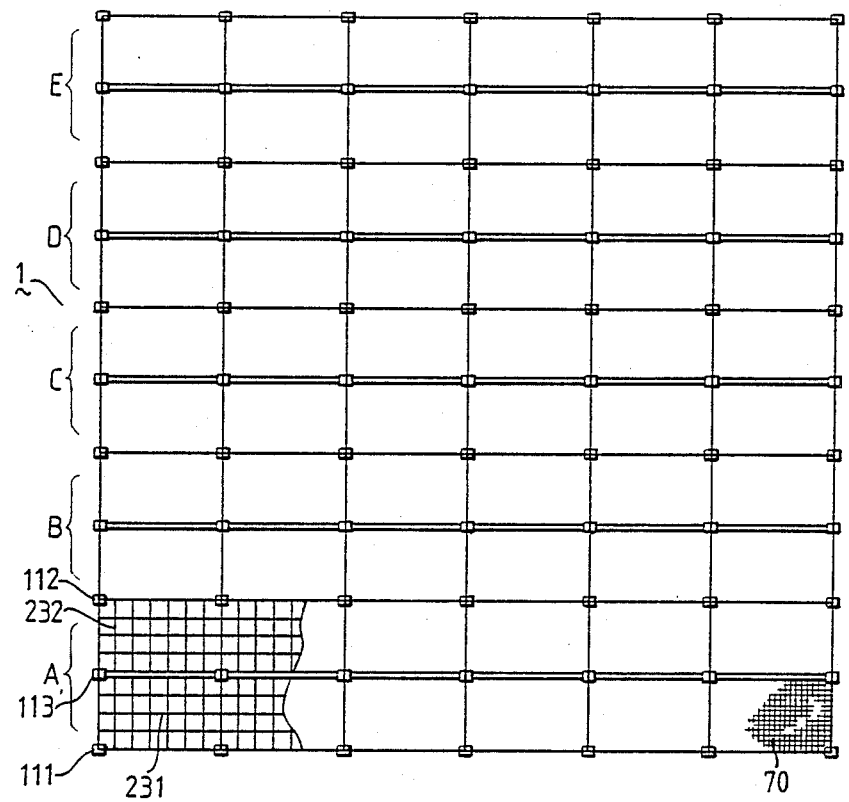
FIG. 1 is a schematic plan view of an embodiment of the shelter according to the present invention.
Figure 4:
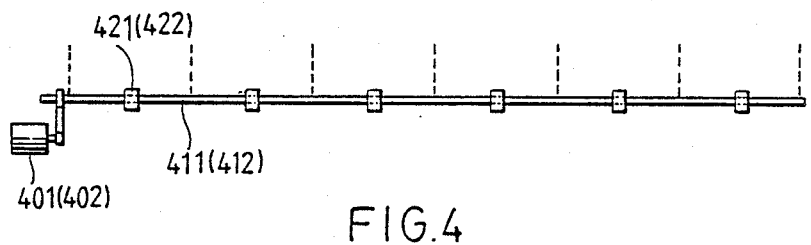
FIG. 4 is a top view of the winder illustrated in FIG. 2.
Figure 3:
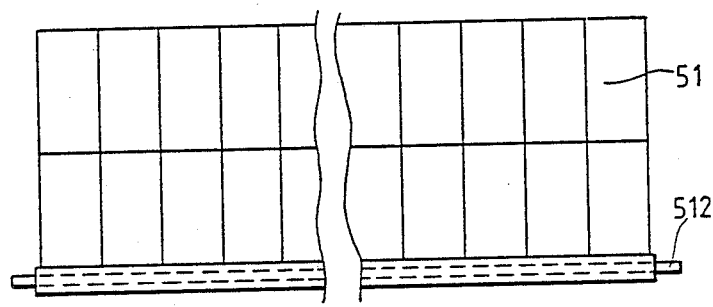
FIG. 3 is a top view of a network frame of the sub-shelter illustrated in FIG. 2.

Referring to FIG. 1, which is a plan view of an embodiment according to the present invention, this embodiment is designed for adapting to a large-scale farm which cultivates a great variety of plants or rotating crops. As shown in the figure, the shelter 1 is composed of five sub-shelters, i.e. Row A, Row B, Row C, Row D and Row E. Their constructions are similar to one another except several modifications are needed for adapting to the plants being cultivated. FIG. 2 shows a side elevational view of one of the sub-shelters, such as Row A ( hereinafter referred as sub-shelter A Referring to FIG. 1 and FIG. 2, the sub-shelter A comprises a ridge pole 2 horizontally extending through the overall length of the sub-shelter and parallel to the ridge poles of other sub-shelter. The ridge pole 2 is supported by a framework 20. The framework 20 is composed of two rows of posts 211 and 212 which are disposed in the two sides of the ridge pole 2 and fixed by the respective bases 111, 112 cast around their feet, two rows of rafters 221, 222 which are connected between the ridge pole 2 and the posts 211, 212 for supporting the ridge pole 2 and being supported by the posts 211, 212 and two network roofs 231, 232 ( shown in FIG. 1 connected between and supported by the ridge pole 2, the posts 211, 212 and the rafters 221, 222. Along the ridge pole 2, there are two rows of pulley blocks 31, 32 fixed thereunder. The pulley blocks 31, 32 are adapted to be activated via wires 331, 332 by winders 411, 412, illustrated in FIG. 4, which are rotatably supported by bearings 421, 422 and respectively driven by motors 401, 402. Under the network roofs 231, 232, there are two rows of network frames 51, 52, as shown in FIG. 3, the constructions of which are similar to the network roofs 231, 232 illustrated in FIG. 1. Each one of the network frames 51, 52 respectively has a substantial plane, one side 511 or 521 of which is hinged between two of the above-mentioned posts 211—211 or 212—212 and the opposite side which has a rod 512 or 522 horizontally fixed therewith is hoisted via the wire 331 or 332 by the pulley block 31 or 32. As shown in FIG. 1, the rods 512, 522 are supported by a short post 213 and can be hooked up therein by hangers 214, 215 rotatably mounted in the top end of the same while they are disposed in the lowest position. Therefore, the network frames 51, 52 can be hoisted up to an elevated position and descended down to the lowest.

Each one of the network frames 51, 52 has a water-proof sheet 6 covering thereupon. One side of the water-proof sheet 6 is fixed nearby the posts 211 or 212, and along the periphery of the opposite side, there is a rod 61 fixed therewith. A winder 62 is mounted for winding the water-proof sheet 6 via a wire 63. Therefore, the water-proof sheet 6 can be wound up to the side 511 nearby the posts 211 or 212 and unwound down to the side nearby the rod 512 or 522. In this embodiment, the water-proof sheet 6 is a translucent plastic sheet, however, if necessary, a transparent or an opaque sheet can also be used too. The water-proof sheet is used for filtering the sunlight and preventing the plants or crops from damage by rain.

Figure 6:
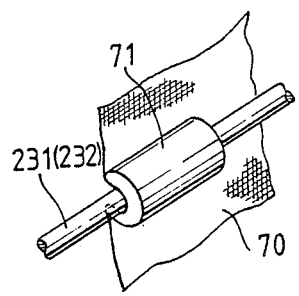
FIG. 6 is a perspective view for illustrating the manner in which the net is clamped fixedly onto the network roof.

As shown in FIG. 1 and FIG. 2, this embodiment has a netting 70 which is mounted to cover the overall shelter 1 for protecting the plants or crops from damage by birds, insects or other animals. Referring to FIG. 6, the portion of the netting 70 disposed on the network roofs 231, 232 is fixed by a plurality of U-shaped clamps 71. On the portion of the netting 70 disposed on the network roofs 231, 232, further there are a plurality of black nets 8. The constructions of the black nets 8 are similar to the water-proof sheets 6 illustrated in FIG. 2. Each one of the black nets 8 has one side being fixed nearby the posts 211 or 212, a rod 81 attached in the opposite side which is nearby the ridge pole 2 and a winder 82 mounted for winding the black net 8 via a wire 83. Therefore, the black nets 8 can be wound up to the side nearby the ridge pole 2 or unwound down to the side nearby the posts 211 or 212. The black nets 8 can filter the sunlight and provide an exposure degree of direct sunlight which is adaptable to an orchid or the like.

Figure 5:
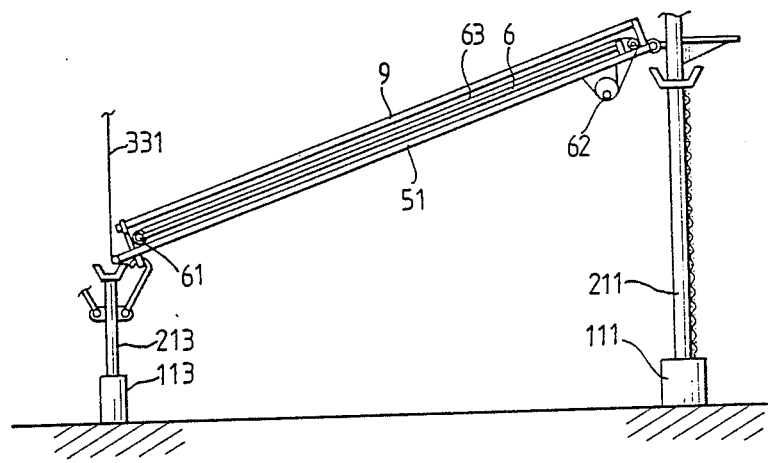
FIG. 5 is a partially sectioned side elevational view of a pressing rod for use in the above-mentioned embodiment.

If necessary, the framework 20 of this embodiment, except the roof portion, can be surrounded by a covering (not shown) for protecting the plants or crops from being blown down or blown away by wind. Further, if necessary, especially for the harvested crops, the network frames 6 can be lowered down to the lowest position to press the pile of crops. As shown in FIG. 5, a plurality of rods 9 can also be provided to press the water-proof sheet 6 while the wind is strong.

As shown in FIG. 2, each row of posts 211, 212 and 213 preferably has an open channel 251, 252 or 253 for guiding the rain water tom flow down along the water-proof sheets 6.

Figure 7:
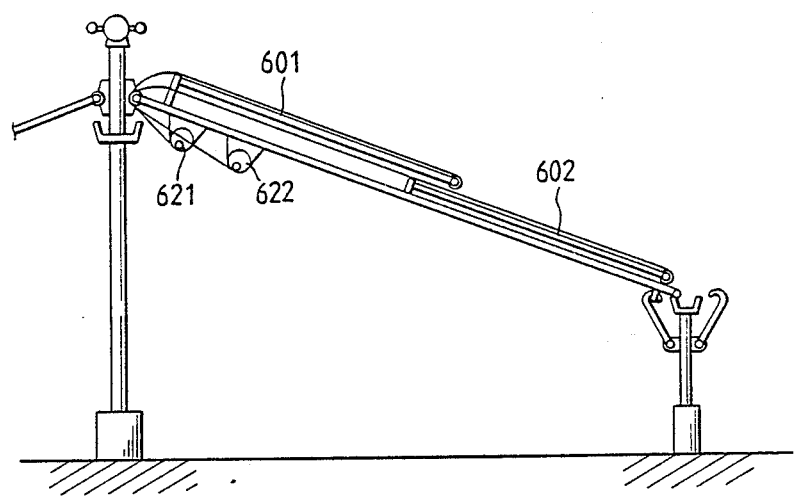
FIG. 7 is a schematic side elevational view of the mechanism for winding the water-proof sheet of another embodiment.

As shown in FIG. 7, which is a schematic side elevational view of a mechanism for winding the water-proof sheet 6 of another embodiment, there are two layers of sheets 601, 602 which can be wound respectively by the winders 621 and 622.

While the invention has been described in connection with what is presently considered to be the most practical and preferred embodiment, it is to be understood that the invention is not to be limited to the disclosed embodiments, but, on the contrary, is intended to cover various modifications and equivalent arrangements included within the spirit and scope of the broadest interpretation so as to encompass all such modifications and equivalent arrangements.

I claim:
1. A shelter comprising:
a framework;
at least one ridge pole horizontally supported by the framework;
at least one pulley supported on the ridge pole;
a network frame hinged to the framework at a side thereof and hoisted by the pulley at the opposite side of the network frame;
a translucent water-proof sheet, supported on and covering the network frame, capable of being wound up to one side of the network frame;
a network roof disposed above the network frame and connected with the ridge pole;
a sunlight filtering black net, supported on and covering the network roof, capable of being wound up to one side of the network roof; and
a netting covering the overall shelter for isolating it from the surroundings, the black net being disposed above the netting.
2. A shelter as claimed in claim 1, further comprising:
winders for winding the water-proof sheet and the black net, and for driving the pulley so as to raise and lower the network frame; and
motors for driving the winders.

* * * * *